United States Patent [19]
Ishikawa

[11] Patent Number: 5,618,116
[45] Date of Patent: Apr. 8, 1997

[54] SEALED THRUST BEARING

[75] Inventor: Shuichi Ishikawa, Kanagawa, Japan

[73] Assignee: NSK Ltd., Tokyo, Japan

[21] Appl. No.: 457,460

[22] Filed: Jun. 1, 1995

[30] Foreign Application Priority Data

Jun. 3, 1994 [JP] Japan .................................. 6-122323

[51] Int. Cl.$^6$ ................................................ F16C 33/76
[52] U.S. Cl. ........................... 384/607; 384/485; 384/482; 277/95
[58] Field of Search .................................. 384/482, 485, 384/486, 607, 609, 615, 618, 620, 622; 277/38, 95

[56] References Cited

U.S. PATENT DOCUMENTS

| | | | |
|---|---|---|---|
| 3,858,950 | 1/1975 | Otto | 384/485 |
| 4,043,620 | 8/1977 | Otto | 384/485 |
| 4,162,110 | 7/1979 | Gardella | 384/607 |
| 4,325,591 | 4/1982 | Otto | 384/486 |
| 4,400,041 | 8/1983 | Lederman . | |
| 4,505,524 | 3/1985 | Krall | 384/615 |
| 4,780,005 | 10/1988 | Toyoshima et al. . | |
| 4,919,551 | 4/1990 | Nunotani et al. | 384/485 |
| 4,958,947 | 9/1990 | Peter et al. | 384/609 |
| 5,344,241 | 9/1994 | Wells | 384/607 |
| 5,435,655 | 7/1995 | Wells | 384/620 |

FOREIGN PATENT DOCUMENTS

| | | | |
|---|---|---|---|
| 62-204016 | 12/1987 | Japan . | |
| 3-85720 | 8/1991 | Japan . | |
| 5-238369 | 9/1993 | Japan | 384/607 |
| 5-79047 | 10/1993 | Japan . | |
| 1187290 | 7/1970 | United Kingdom | 384/607 |

*Primary Examiner*—Daniel P. Stodola
*Assistant Examiner*—Matthew A. Kaness
*Attorney, Agent, or Firm*—Sughrue, Mion, Zinn, Macpeak & Seas

[57] ABSTRACT

In a sealed thrust bearing providing a case which is formed of a corrosion resisting material and fixedly fitted to an outer race, an outer seal ring which is fixedly fitted to the outer peripheral edge of an inner race, and an inner seal ring which is fixedly fitted to an inner flange, the outer peripheral edge of a first outer seal lip forming the outer seal ring is slidingly contacted with the inner peripheral surface of the outer cylindrical portion of the case. The end edge of a first inner seal lip forming the inner seal ring is slidingly contacted with the flat portion of the case. In the inner peripheral edge of the flat portion, an inner cylindrical portion is so formed as to cover the sliding contact portion between the end edge of the first inner seal lip. The sealed thrust bearing can prevent the sliding contact portions thereof from being worn greatly even if rain, mud or the like splash on them.

12 Claims, 6 Drawing Sheets

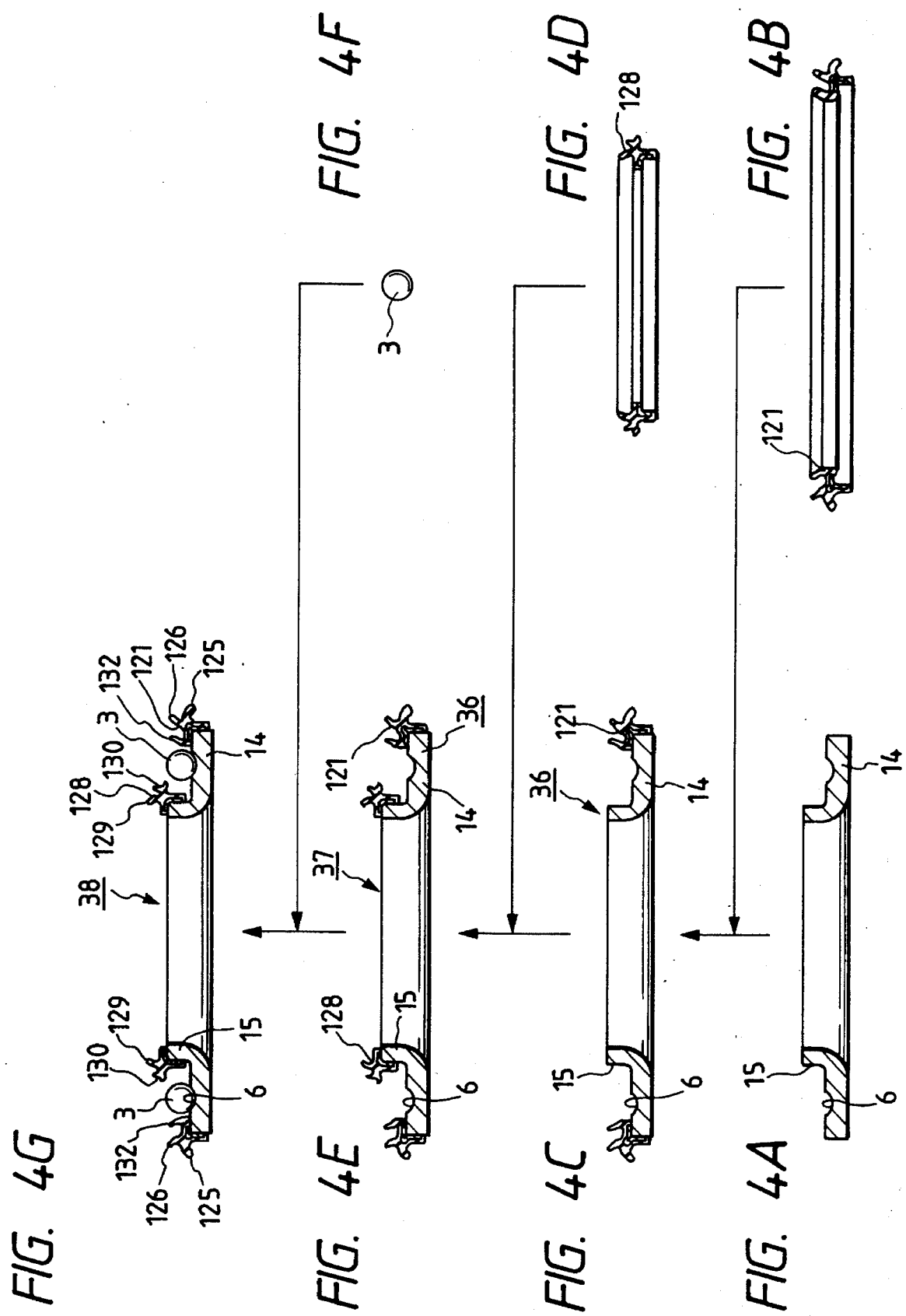

SEALED THRUST BEARING

BACKGROUND OF THE INVENTION

The present invention relates to a sealed thrust bearing which is used in a vehicle, particulary, which is assembled into a strut forming a suspension for supporting front wheels of the vehicle.

In a suspension of a strut type that supports the front wheels of a vehicle serving as the steering wheels thereof, a damper case forming an oil damper is supported in such a manner that it can be moved up and down with respect to the body of a vehicle. The front wheels are rotatably supported on a pivot fixed to the lower end portion of the damper case, while the oil damper is supported such that it can be freely rotated with respect to the vehicle body. Therefore, between the upper end portion of a rod forming the oil damper and the vehicle body, it is necessary to dispose a thrust bearing which supports the rod rotatably while receiving a thrust load.

As a thrust bearing to be used in such portion, conventionally, there is known a sealed thrust bearing which is disclosed in, for example, U.S. Pat. No. 4,780,005. As shown in FIG. 7, the sealed thrust bearing includes an outer race 1 and an inner race 2 respectively formed in an annular shape, and a plurality of rolling elements 3 respectively held between the outer race 1 and inner race 2. In the conventional thrust bearing shown in FIG. 7, the rolling elements 3 are with balls. In the case of a thrust bearing is used in a bulky vehicle, other rolling elements can be used such as a tapered roller and the like.

The outer race 1 includes an outer raceway 4 on one surface thereof (a lower surface viewed in FIG. 7) and an outer flange 5 in the outer peripheral edge thereof. Also, the inner race 2 includes an inner raceway 6 on one surface thereof (an upper surface viewed in FIG. 7) and an inner flange 7 in the inner peripheral edge thereof. Further, the plurality of rolling elements 3 are rollably interposed between the outer raceway 4 and inner raceway 6 and permit the rotation of the outer and inner races 1 and 2 relative to each other.

Moreover, an outer seal ring 8 is interposed between the outer flange 5 and the outer peripheral edge of the inner race 2, while an inner seal ring 9 is interposed between the inner flange 7 and the interior portion of the thrust bearing locating near the inner periphery of the outer race 1. These seal rings 8 and 9 include core metals 10a, 10b and elastic elements 11a, 11b, respectively. The core metal 10a forming the outer seal ring 8 is fitted into and fixed to the outer flange 5, while the end edge of a lip 12a of the elastic element 11a reinforced by the core metal 10a slidingly contacts the outer peripheral edge of the inner race 2. Also, the elastic element 11b forming the inner seal ring 9 and reinforced by the core metal 10b is fitted over the inner flange 7, while the end edge of a lip 12b formed in the elastic element 11b slidingly contacts the portion of the outer race 1 locating near the inner periphery of the one surface (lower surface viewed in FIG. 7) of the outer race 1.

As described above, the interposition of the two outer and inner seal rings 8 and 9 between the outer and inner races 1 and 2 not only can prevent outward leakage of grease existing in the portion where the plurality of rolling elements 3 are held but also can prevent foreign matter such as dust, rain and the like from entering into such portion. Also, the engagement between the lip 12a of the outer seal ring 8 and the outer peripheral edge of the inner race 2 can prevent the inner race 2 and outer race 1 from being separated from each other even before the sealed thrust bearing is assembled into a predetermined position. This makes it possible to handle the respective components of the sealed thrust bearing in an integral manner, so that the assembling operation of the sealed thrust bearing can be simplified.

Also, Unexamined Japanese Utility Model Publication No. Hei. 5-79047 has proposed such a structure as shown in FIG. 8. In the structure shown in FIG. 8, not only the lip 12a of the outer seal ring 8 is engaged with the outer peripheral edge of the inner race 2, but also the lip 12b of the inner seal ring 9 is engaged with the inner peripheral edge of the outer race 1. As a result of this, when compared with the structure shown in FIG. 7, it is capable of obtaining a higher separation preventive effect between the outer and inner races 1 and 2.

However, in both of the conventional sealed thrust bearings structured in the above-mentioned manner, there are still found some problems to be solved. That is, in either of the above two structures, the lip 12a of the elastic element 11a of the outer seal ring 8 supported by the outer flange 5 is exposed externally. Also, in the structure shown in FIG. 8, not only the outer lip 12a but also the inner lip 12b are exposed externally.

During use of the vehicle, rain or mud tends to splash on the sliding portions between the externally exposed end edges of the lips 12a, 12b and their respective mating surfaces (that is, the inner peripheral edge surface of the inner race 2 and the inner peripheral edge surface of the outer race 1). Also, after the splashed mud dries, foreign matter such as the mud, dust and the like are left on the sliding portions, so that there is a possibility that such foreign matters may act as an abrasive to damage the end edges of the lips 12a, 12b and their mating surfaces. As a result of this, the end edges of the lips 12a, 12b and their respective mating surfaces may wear quickly to thereby lose the ability to prevent the rain and mud from entering into the rolling elements provision portion.

The above-mentioned wear can be further increased due to rust produced on the mating surfaces. In most cases, the outer and inner races 1 and 2 to be incorporated into the sealed thrust bearing for use in the suspension system are wholly formed of carbon steel, and surface treatment layers such as an electro-zincing layer or the like are formed on the surface of the outer and inner races in order to protect them against corrosion. However, if such wear increases greatly due to the foreign matter in the sliding portions, then the surface treatment layers are worn away to expose the carbon steel, with the result that the exposed carbon steel portion gathers rust. And, the rust scrapes the end edges of the lips 12a, 12b to thereby accelerate further the wear of the end edges.

SUMMARY OF THE INVENTION

The present invention has been made in view of problems associated with a conventional sealed thrust bearing. An object of the invention is to provide a sealed thrust bearing which can prevent the above-mentioned wear.

In attaining above object, according to a first aspect of the present invention, there is provided a sealed thrust bearing which includes: an annular-shaped outer race including an outer raceway on a surface thereof; an annular-shaped inner race including an inner raceway on a surface thereof and a cylindrical inner flange formed in an inner peripheral edge of the inner race and projecting from a side of the inner raceway; a plurality of rolling elements interposed rollably between the outer and inner raceways; an annular-shaped outer seal ring fixedly fitted to an outer peripheral edge of the inner race; an annular-shaped inner seal ring fixedly fitted to an end edge portion of the inner flange of the inner race; and a case formed in an annular shape and fixedly fitted to the outer race, in which the case includes: an annular-shaped flat portion; an outer cylindrical portion formed in an outer peripheral edge of the flat portion; and an inner cylindrical portion formed in an inner peripheral edge of the flat portion and having an outside diameter smaller than an inside diameter of the outer race, in which the outer cylindrical portion and the inner cylindrical portion are bent in the same direction, and the outer cylindrical portion is fitted over the outer race so as to cover the outer seal ring and the inner seal ring.

According to a second aspect of the present invention, there is provided a sealed thrust bearing which includes: an annular-shaped outer race including an outer raceway on a surface thereof; an annular-shaped inner race including an inner raceway on a surface thereof; a plurality of rolling elements interposed rollably between the outer and inner raceways; and an annular-shaped outer seal ring fixedly fitted to an outer peripheral edge of the inner race, in which the outer seal ring provides a core metal including: a cylindrical portion fixedly fitted to the outer peripheral edge of the inner race; an inwardly bent portion contacting the surface of the inner race; and a projecting portion formed in a middle portion between the cylindrical portion and the inwardly bent portion and projecting outwardly from a corner portion of the inwardly bent portion.

According to a third aspect of the present invention, there is provided a sealed thrust bearing which includes: an annular-shaped outer race including an outer raceway on a surface thereof; an annular-shaped inner race including an inner raceway on a surface thereof and a cylindrical inner flange formed on an inner peripheral edge of the inner race and projecting from a side of the inner raceway; a plurality of rolling elements interposed rollably between the outer and inner raceways; a case formed in an annular shape and fixedly fitted to the outer race, the case including an annular-shaped flat portion; and an annular-shaped inner seal ring fixedly fitted to an end edge portion of the inner flange of the inner race, in which the inner seal ring includes: a core metal including a cylindrical portion fixedly fitted to the inner flange of the inner race and an inwardly bent portion contacting an upper end edge of the inner flange; and an elastic member including a first inner seal lip contacting an inner peripheral surface of the flat portion of the case and a second inner seal lip having a first sub-lip and a second sub-lip, the first and second sub-lips contacting an inner peripheral edge of the outer race.

In the sealed thrust bearing of the present invention thus structured, the sliding contact of the outer seal lip of the outer seal ring with the inner peripheral surface of the outer cylindrical portion and the sliding contact of the inner seal lip of the inner seal ring with the inner surface of the flat portion prevent rain, mud and the like from entering into the portion in which the rolling elements are provided. The respective seal lips and the sliding portions of the mating surfaces are covered with the outer cylindrical portion or with the inner cylindrical portion formed in the inner peripheral edge of the flat portion, so that they are not exposed to the outside of the bearing. This makes it difficult for rain or mud to splash on the respective sliding portions, so that it prevents the end edges of the respective seal lips and the mating surfaces from being worn.

BRIEF DESCRIPTION OF THE DRAWINGS

In the accompanying drawings:

FIGS. 4A to 4G are sectional views, showing in the order of steps how an inner race and outer and inner seal rings are combined to provide an inner race side unit rolling elements are assembled into the inner race side unit;

DETAILED DESCRIPTION OF THE PREFERRED EMBODIMENTS

Figure 1:
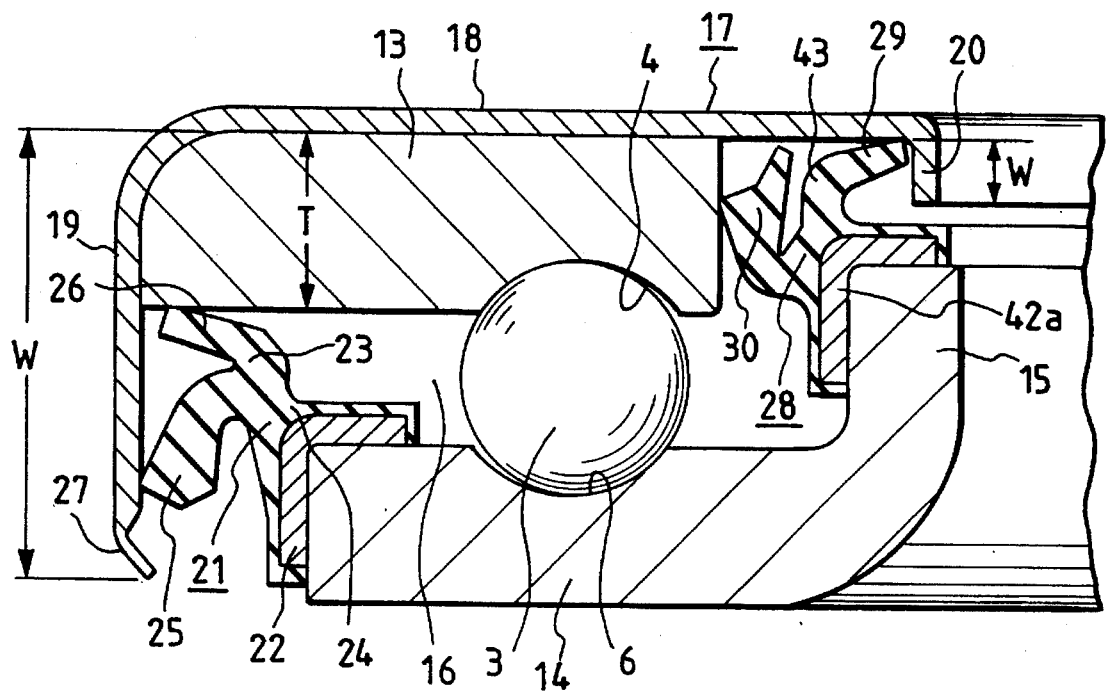
FIG. 1 is a partial sectional view of a first embodiment of a sealed thrust bearing according to the present invention.

FIG. 1 shows a first embodiment of a sealed thrust bearing according to the present invention. In the first embodiment, an outer race 13 is formed of hard metal such as carbon steel or the like in an annular shape, and includes an outer raceway 4 on one surface thereof (in FIG. 1, a lower surface). An inner race 14 is also formed of hard metal such as carbon steel or the like in such a manner that it has an L-shaped section and it has a annular shape as a whole. The inner race 14 includes an inner raceway 6 on one surface thereof (in FIG. 1, an upper surface), while the inner race 14 further includes a cylindrical inner flange 15 formed in the inner peripheral edge thereof in a manner to extend along the entire periphery thereof. The inner flange 15 projects from one surface side (in FIG. 1, upper side) of the inner race in which the inner raceway 6 is arranged. A surface treatment layer is formed on the surface of the inner race 14 in order to secure a corrosion resisting property. A plurality of rolling elements 3 are rollably interposed between the outer and inner raceways 4 and 6 so that the outer and inner races 13 and 14 can be freely rotated with respect to each other. In the first embodiment as shown in FIG. 1, balls are used as the rolling elements 3. However, when a thrust load to be carried is large, tapered rollers or cylindrical rollers can also be used as the rolling element 3. Also, as the need arises, cages can be provided to prevent mutually adjoining rolling elements from contacting each other.

Further, between one surface of the outer race 13 and one surface of the inner race 14, there is interposed a sealing device, which is a characteristic of the present invention, to seal the two ends of a space 16 in which the plurality of rolling elements exist, thereby preventing various foreign matter such as rain, mud, dust and the like from entering into the space 16.

A case 17 forming the sealing device is fitted over and fixed to the outer race 13. The case 17 is formed of a corrosion resistant metal plate such as SUS 430, or a plate-shaped member having corrosion resistance and contraction resistance formed of a synthetic resin such as engineering plastic or the like in such a manner that it has an annular shape as a whole. When the case 17 is formed of a metal plate, a plastic it can be from by drawing or the like. On the other hand, when the case 17 is formed of synthetic resin, an injection molding process can be used. The case 17 includes a flat portion 18 shaped annularly. The flat portion 18 includes an outer cylindrical portion 19 in the outer peripheral edge thereof and an inner cylindrical portion 20 in the inner peripheral edge thereof, both of which are bent to extend in the same direction (in FIG. 1, in the downward direction).

In the respective cylindrical portions 19 and 20, the outer cylindrical portion 19 has a width W sufficiently larger than the thickness T of the outer race 13 (that is, W>T). Also, in free condition, the outer cylindrical portion 19 has an inside diameter that is slightly smaller than the outside diameter of the outer race 13. On the other hand, the inner cylindrical portion 20 has a width w smaller than the thickness T of the outer race 13 and an outside diameter that is sufficiently smaller than the inside diameter of the outer race 13. Therefore, the portion of the flat portion 18 locating near the inner periphery thereof (that is, the portion thereof near the right of FIG. 1) projects more inwardly in the diameter direction of the case 17 than the inner peripheral edge of the outer race 13. The thus structured case 17 is fitted over and fixed to the outer race 13 by fitting the outer cylindrical portion 19 over the outer race 13.

An annular outer seal ring 21 is fitted over and fixed to the outer peripheral edge of the inner race 14. The outer seal ring 21 includes a seal member 23 reinforced by a core metal 22 having an L-shaped section. The core metal 22 is made of a cold rolled steel sheet (steel belt) formed of SPCC (JIS G 3141) or the like, while the seal member 23 is made of an elastic material such as rubber, elastomer or the like. The seal member 23 is formed in an annular shape by molding the core metal 22. The seal member 23 includes a connecting portion 24 having a base end portion (in FIG. 1, the right lower end portion) thereof connected to the core metal 22, and first and second outer seal lips 25 and 26 branching forkedly from the end portion (in FIG. 1, the left upper end portion) of the connecting portion 24.

In assembling the sealed thrust bearing, these outer seal lips 25 and 26 are respectively deformed elastically to bring their respective end edges into elastic contact with their mating surfaces. That is, the end edge of the first outer seal lip 25 is elastically contacted with the middle portion of the inner peripheral surface of the outer cylindrical portion 19 of the case 17, while the end edge of the second outer seal lip 26 is elastically contacted with the portion of one surface of the outer race 13 to the outer periphery thereof. The end edges of outer seal lips 25, 26 and their mating surfaces are slidingly contacted with each other as the outer and inner races 13 and 14 are rotated with respect to each other.

On the other hand, an annular inner seal ring 28 is fitted over and fixed to the end edge portion of the inner flange 15. The inner seal ring 28, similarly to the outer seal ring 21, includes a core metal 42 having an L-shaped section and a seal member 43 molded on the core metal 42. The seal member 43 includes a first inner seal lip 29 and a second inner seal lip 30. In assembling the sealed thrust bearing, the end edge (in FIG. 1, the upper end edge) of the first inner seal lip 29 is elastically contacted with the portion of the inner surface to the inner periphery of the flat portion 18 of the case 17, that is, the portion projecting more inwardly in the diameter direction of the case 17 than the inner peripheral edge of the outer race 13. The end edge of the second inner seal lip 30 is elastically contacted with the inner peripheral edge of the outer race 13. The end edges of the respective inner seal lips 29, 30 and their mating surfaces are slidingly contacted with each other as the outer and inner races 13 and 14 are rotated with respect to each other.

In the sealed thrust bearing of the present invention structured in the above-mentioned manner, the sliding contact of the first and second outer seal lips 25 and 26 respectively provided in the outer seal ring 21 with the inner peripheral surface of the outer cylindrical portion 19 or with one surface of the outer race 13 seals the outer peripheral side opening of the space 16 in which the rolling elements 3 exist. Further, the sliding contact of the first inner seal lips 29 and 30 respectively provided in the inner seal ring 28 with the inner surface of the flat portion 18 or with the inner peripheral edge of the outer race 13 seals the inner peripheral side opening of the space 16. This structure is sure to prevent rain, mud and the like from entering into the space 16 in which the rolling elements are provided, through the outer and inner peripheral side openings.

Particularly, in the sealed thrust bearing according to the present invention, the sliding contact portions between the seal lips 25, 26, 29, 30 and their respective mating surfaces are covered with the outer cylindrical portion 19 or with the inner cylindrical portion 20 formed in the inner peripheral edge of the flat portion 18, so that they are not exposed to the outside of the bearing. This structure makes it difficult for rain or mud to splash on the respective sliding contact portions, thereby being able to prevent the end edges of the respective seal lips 25, 26, 29, 30 and their mating surfaces from wearing. Further, even when rain or the like is applied from above, the rain or the like flows down while it is guided by the case 17 and, therefore, the rain or the like is not likely to adhere to the sliding contact portions. In addition, foreign matter such as dry mud and the like also do not stick to the sliding contact portions. Further, in the first embodiment as shown in FIG. 1, the seal lips 25, 26, 29, 30 are provided doubly in both of the outer and inner peripheral side opening portions. The double structure can prevent the foreign matter from entering into the space 16 more positively. The inner cylindrical portion 20 not only covers the sliding contact portions but also increases the strength of the flat portion 18 to thereby make it difficult for the flat portion 18 to deform. Further, the inner cylindrical portion 20 guides downwardly the rain or the like applied onto the present thrust bearing, thereby making it difficult for the rain or the like to reach the sliding contact portions.

The case 17, which includes the outer cylindrical portion 19 to be slidingly contacted by the end edge of the first outer seal lip 25 and the flat portion 18 to be slidingly contacted by the end edge of the first inner seal lip 29, is formed of a corrosion resisting material such as a stainless steel plate, synthetic resin or the like. This eliminates the possibility that the mating surfaces to be slidingly contacted by the end edges of the seal lips 25, 29 can gather rust, that is, there is eliminated the possibility that the end edges of the seal lips 25, 29 can be worn greatly due to rust. In some cases, similarly to the conventional structure, as the need arises, surface treatment can be performed on the outer race 13 with which the end edges of the second outer and inner seal lips 26 and 30 can be slidingly contacted. Outside the sliding contact portions between the end edges of the second outer and inner seal lips 26, 30 and the outer race 13, there exists a seal portion formed by the first outer and inner seal lips 25 and 29. Due to existence of the seal portion, rain or the like can little enter into the sliding contact portions between the end edges of the second outer and inner seal lips 26, 30 and the outer race 13. Therefore, even when the outer race 13 is formed of carbon steel or the like, there is almost no possibility that these sliding contact portions can gather rust.

The end portion of the outer cylindrical portion 19 is bent inwardly in the diameter direction of the cylindrical portion 19 to thereby form a thin bent portion 27. The forming operation of the bent portion 27 is performed after the first and second outer seal lips 25 and 26 are inserted into the outer cylindrical portion 19. After the bent portion 27 is formed, the engagement between the outer peripheral edge portion of the first outer seal lip 25 and the bent portion 27 prevents the outer seal ring 21 and the inner race 14 fixedly fitted to the outer seal ring 21 from separating from the outer race 13 with the case 17 fixedly fitted thereto. Therefore, the sealed thrust bearing can be handled integrally to thereby facilitate the parts management and assembling operation. Moreover, since the first and second outer seal lips 25 and 26 are elastically deformable, it is also possible to insert the first and second outer seal lips 25 and 26 into the outer cylindrical portion 19 after the bent portion 27 is formed. In any case, the outer cylindrical portion 19 with the bent portion 27 formed therein is improved in strength and thus becomes hard to deform. The thin portion may be formed in a groove shape in the neighborhood of the end portion of the outer cylindrical portion 19.

FIGS. 2 to 6 show a second embodiment of a sealed thrust bearing according to the present invention. In the second embodiment, similarly to the above-mentioned first embodiment, the shapes of outer and inner seal rings 121 and 128 are specially designed. In the second embodiment, the detailed description of similar components to the first embodiment is omitted here.

At first, description will be given of the outer seal ring 121. A core metal 122, which forms the outer seal ring 121, includes a cylindrical portion 122a to be fitted over and fixed to the outer peripheral edge of the inner race 14, an inwardly bent portion 122b contacting with one surface of the inner race 14, and, in the middle portion thereof between the cylindrical portion 122a and inwardly bent portion 122b, a projecting portion 131 which project outwardly (in FIG. 2, in the left upward direction) from the corner portion of the bent portion 122b to reinforce the connecting portion 124 of a seal member 123. The seal member 123, similarly to the first embodiment, is formed in an annular shape by molding with an elastic material such as rubber, elastomer or the like on the core metal 122 formed of a cold rolled steel sheet such as SPCC (JIS G 3141) or the like. The seal member 123 includes first and second outer seal lips 125, 126 respectively branching forkedly from an end of the connecting portion 124 reinforced by the projecting portion 131, and a third outer seal lip 132 formed near the inner periphery of the inwardly bent portion 122b of the core metal 122.

The connecting portion 124 reinforced by the projecting portion 131 can be elastically deformed only a little amount even if the end portion of the first and second outer seal lips 125 and 126 are pushed by their respective mating surfaces as the sealed thrust bearing is assembled.

In assembling the sealed thrust bearing according to the second embodiment, the respective outer seal lips 125, 126, and 132 are elastically deformed to thereby bring their respective end edges into elastic contact with the their respective mating surfaces. In particular, the first outer seal lip 125 has its end edge in elastic contact with the middle portion of the inner peripheral surface of the outer cylindrical portion 19 of the case 17. The second outer seal lip 126 has its end edge in elastic contact with the portion of one surface of the outer race 13 near the outer periphery of such on surface. And, the third outer seal lip 132 has its end edge in elastic contact with the portion of one surface of the outer race 13 near the inner periphery of such one surface, respectively. The end edge of the respective outer seal lips 125, 126, 132 and their respective mating surfaces are slidingly contacted with each other as the outer and inner races 13 and 14 are rotated with respect to each other.

In the second embodiment, since the projecting portion 131 prevents the elastic deformation of the connecting portion 124, it is able to secure sufficiently not only the contact pressure between the end edge of the second outer seal lip 126 and one surface of the outer race 13 but also the contact pressure between the end edge of the first outer seal lip 125 and the inner peripheral surface of the outer cylindrical portion 19. Therefore, the seal lips 125 and 126 can provide a sufficient sealing effect.

Further, the end edge of the third outer seal lip 132 is elastically contacted with one surface of the outer race 13. Accordingly, the outer peripheral side opening of the space 16 is sealed threefold by the first, second and third outer seal lips 125, 126 and 132, which makes it possible to prevent foreign matter from entering into the space 16 more positively.

Next, description will be given below of the inner seal ring 128. A core metal 142, which forms the inner seal ring 128, similarly to the first embodiment, not only has an L-shaped section but also includes a cylindrical portion 142a to be fitted over and fixed to the inner flanges 15 of the inner race 14 and an inwardly bent portion 142b to be contacted with the upper end edge of the inner flange 15. The inner seal ring 128 includes first and second inner seal lips 129 and 130 which are formed in an annular shape by molding an elastic material such as rubber, elastomer or the like on the core metal 142.

The first inner lip 129 has its end edge in elastic contact with the portion of the inner surface of the flat portion 18 of the case 17 near the inner periphery thereof, that is, the portion projecting more inwardly in the diameter direction of the case 17 than the inner peripheral edge of the outer race 13. The second inner seal lip 130 has its end edge in elastic contact with the inner peripheral edge of the outer race 13. The end edges of the inner seal lips 129 and 130 and their respective mating surfaces are slidingly contacted with each other as the outer and inner races 13 and 14 are rotated with respect to each other. Further, the second inner seal lip 130 includes first and second sub-lips 133 and 134 which respectively branch from the end portion of the seal lip 130. The side surface of the end portion of the first sub-lip 133 is elastically contacted with the side end edge of one surface of the inner peripheral edge of the outer race 13, while the side surface of the end portion of the second sub-lip 134 is elastically contacted with the inner peripheral edge of the outer race 13. The mutually intersecting angle formed between the first and second sub-lips 133 and 134 in elastically contacting condition is greater than the angle formed between them in free condition. Therefore, it is able to secure sufficient contact pressures between the end portion side surfaces of the sub-lips 133 and 134 and their respective mating surfaces. That is, the second inner seal lip 130 tends to rotate counterclockwise in FIG. 2 because of the contact between the first sub-lip 133 and the inner peripheral edge of the outer race 13, while the second inner seal lip 130 tends to rotate clockwise in FIG. 2 because of the contact between the second sub-lip 134 and the inner peripheral edge of the outer race 13. As a result of this, the contact pressures between the end portion side surfaces of the two sub-lips 133, 134 and the inner peripheral edge of the outer race 13 increases to a sufficient degree. Therefore, in combination of the sufficient contact pressures with the threefold sealing portion due to the firsthand second inner seal lips 129 and 130, the inner peripheral side opening of the space 16 can also be sealed sufficiently, so that it prevents foreign matter from entering into the space 16 more positively.

Figure 3A:
FIGS. 3A, 3B and 3C are sectional views, showing in the order of steps how a case and an outer race are combined to provide an outer race side unit.
Figure 3B:
Figure 3C:
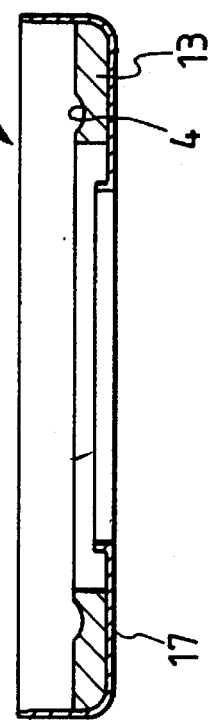

Next, description will be given below of a procedure for assembling the structure according to the second embodiment. At first, the previously manufactured case 17 as shown in FIG. 3A is fitted over the previously manufactured outer race 13 as shown in FIG. 3B to thereby assemble the two members 17 and 13 into an outer race side unit 35, as shown in FIG. 3C.

On the other hand, the previously manufactured seal ring 121 as shown in FIG. 4B is fitted over the outer peripheral edge portion of the previously manufactured inner race 14 as shown in FIG. 4A, so that the two members 14 and 121 are assembled into a unit 36 as shown in FIG. 4C. The previously manufactured inner seal ring 128 as shown in FIG. 4D is assembled to the unit 36 by fitting the seal ring 128 over the end edge portion of the inner flange 15, so that an inner race side unit 37 is formed as shown in FIG. 4E. Then, such rolling elements 3, 3 as shown in FIG. 4F are placed on the inner raceway 6 of the inner race side unit 37, so that a unit 38 is formed as shown in FIG. 4G. At the same time, grease is applied onto the fitting portions of the rolling elements 3, 3 as well as onto the respective seal lips 125, 126, 129, 130 portions.

Figure 5:
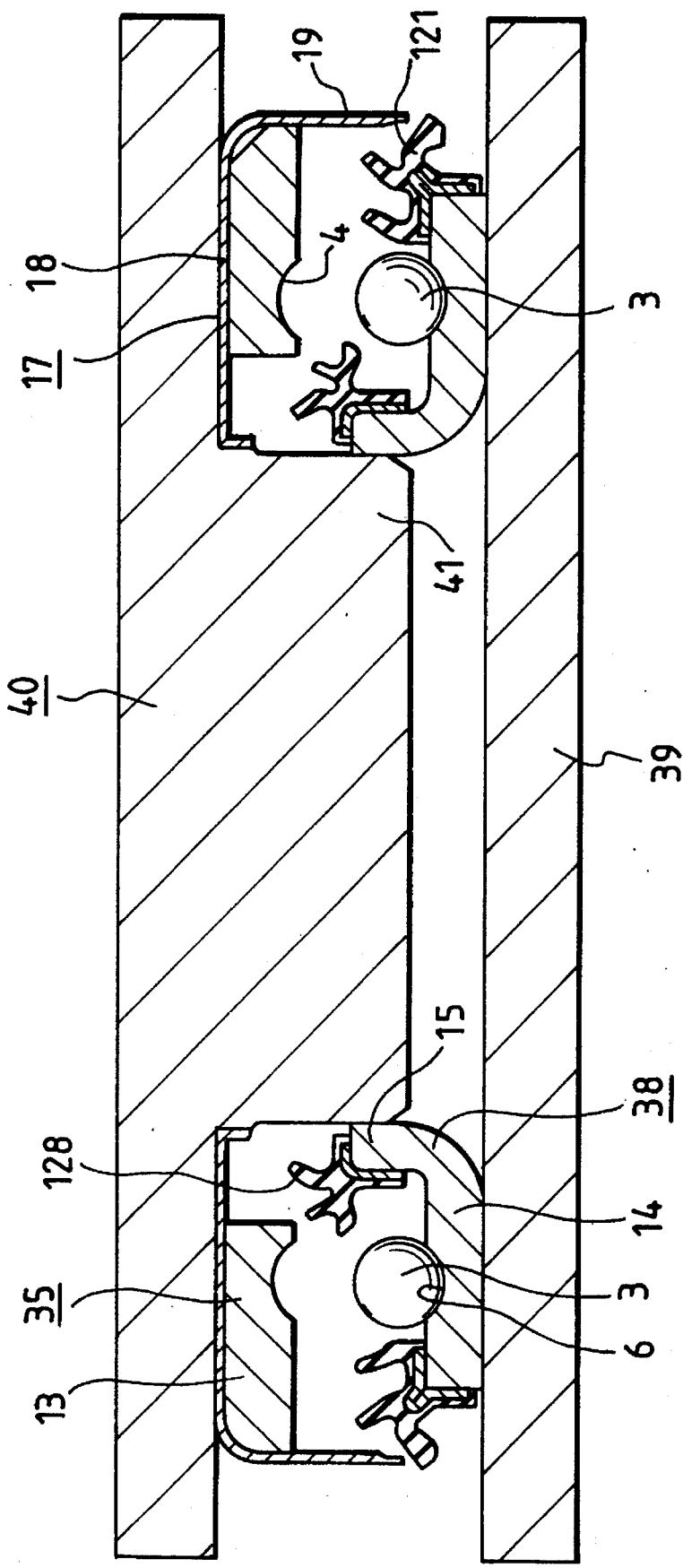
FIG. 5 is a sectional view of the final step of assembling the sealed thrust bearing.

Thus, as shown in FIG. 5, this unit 38 is placed on a receive plate 39, while the outer race side unit 35 is fitted over a guide projection 41 formed in the lower surface of a push plate 40, so that the unit 38 and outer race side unit 35 are disposed opposed to each other. In this state, in the case shown in FIG. 5, the bent portion 27 (as shown FIG. 2) is not yet formed in the end portion of the outer cylindrical portion 19 of the case 17. However, similarly to the first embodiment, the bent portion 27 can also be formed previously.

Figure 2:
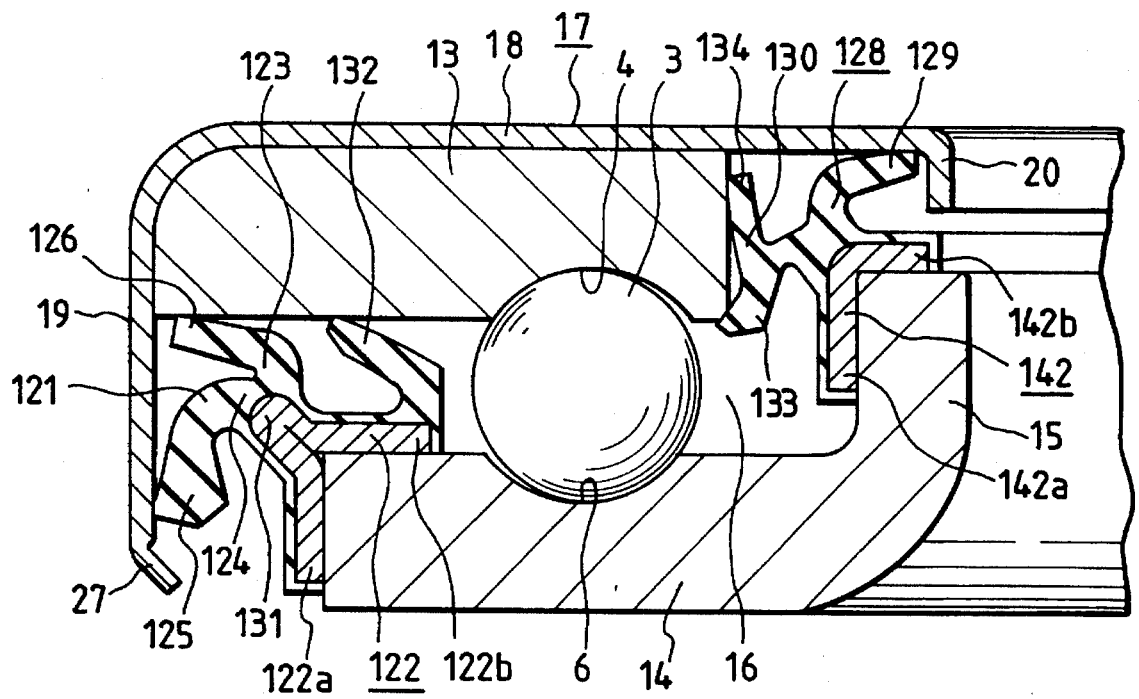
FIG. 2 is a partial sectional view of a second embodiment of a sealed thrust bearing according to the present invention.
Figure 6A:
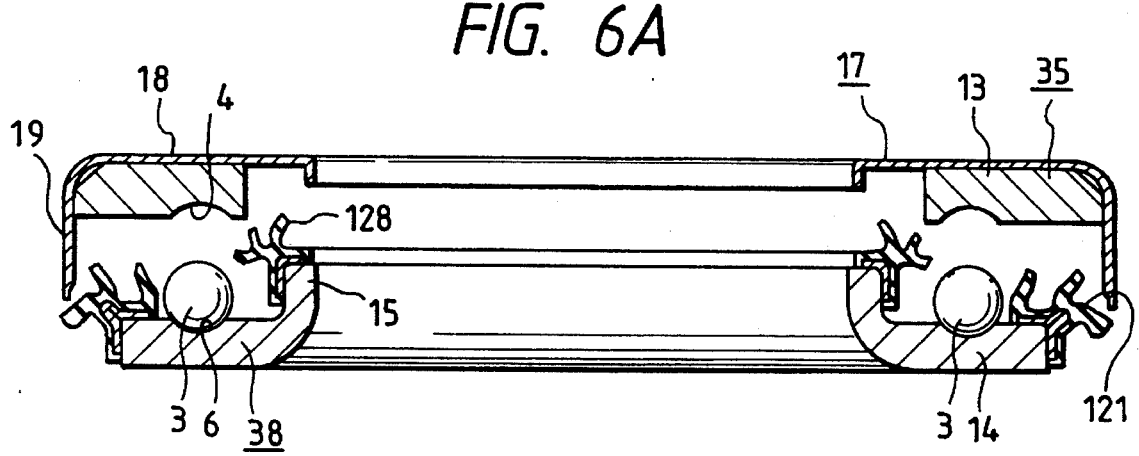
FIGS. 6A, 6B and 6C are sectional views showing sequentially the position relations of the respective components of the sealed thrust bearing in the final assembling step.
Figure 6B:
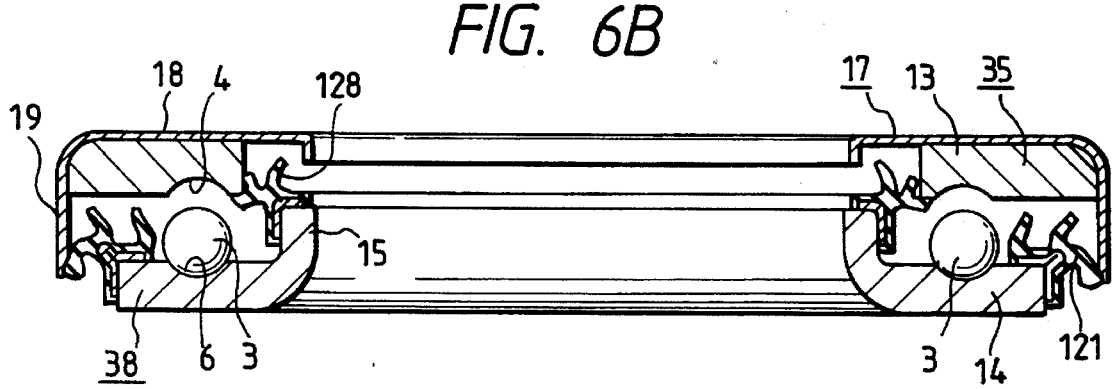
Figure 6C:
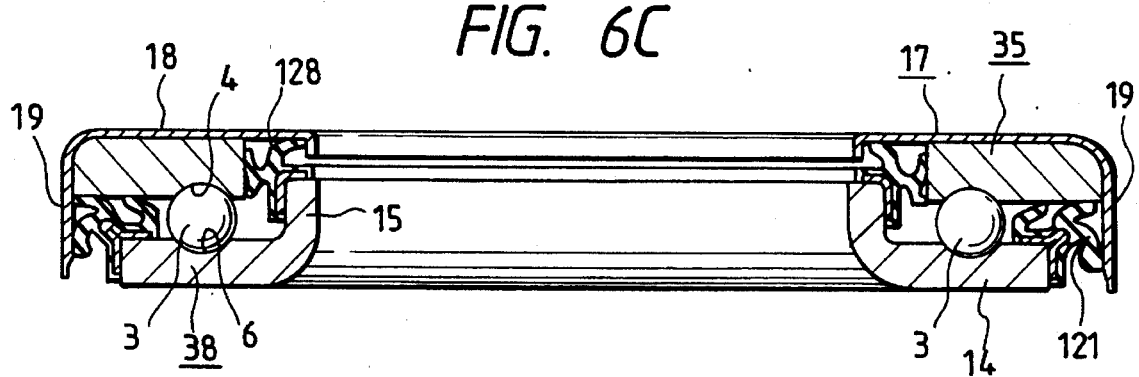
Figure 7:
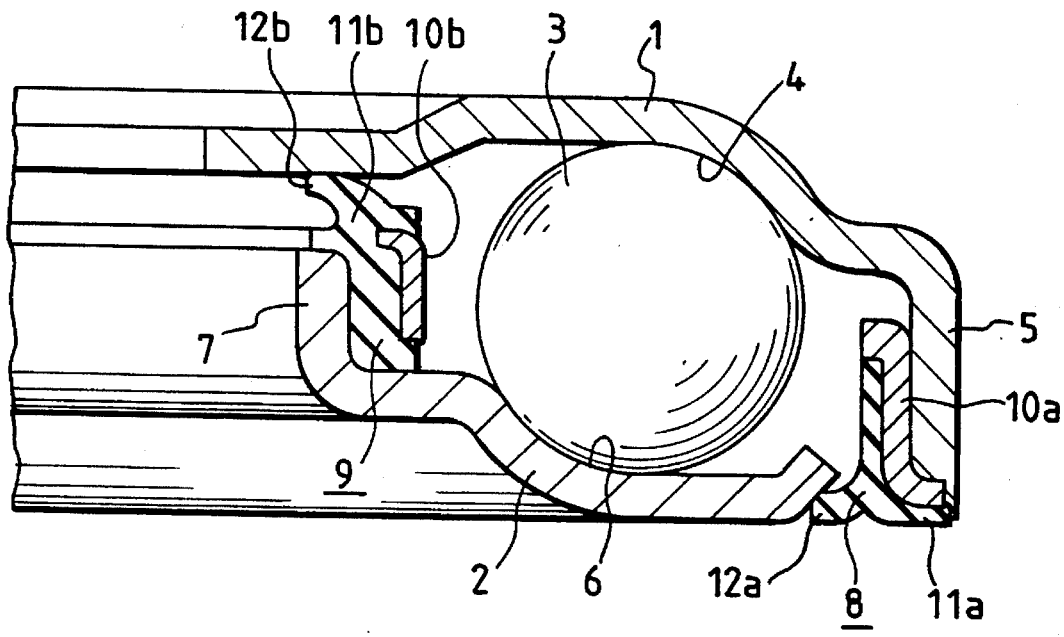
FIG. 7 is a sectional view of a first conventional structure.
Figure 8:
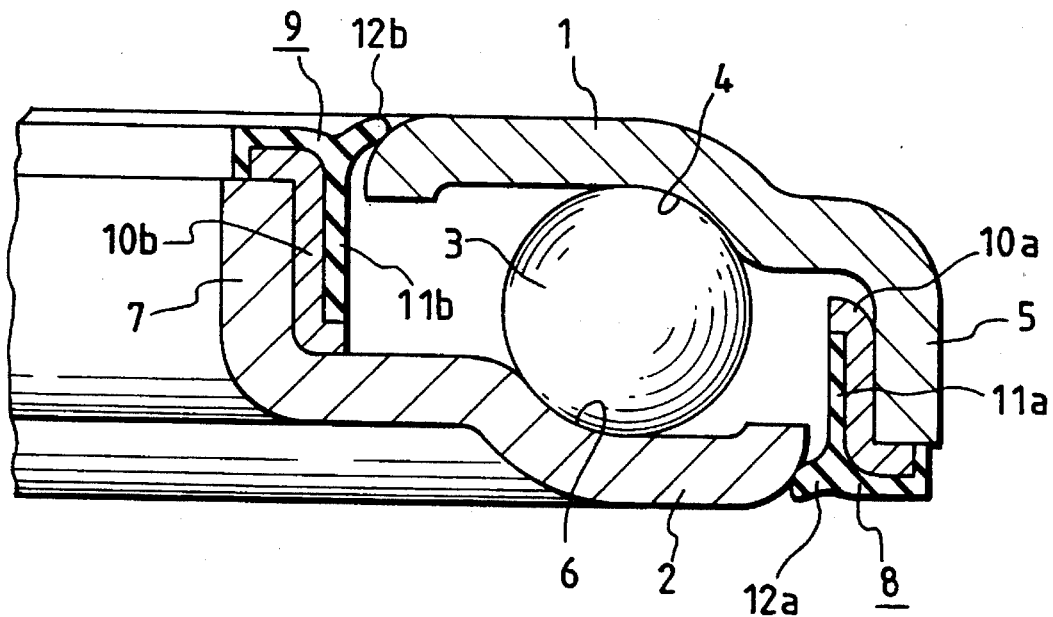
FIG. 8 is a sectional view of a second conventional structure.

After the unit 38 and outer race side unit 35 oppose to each other as shown in FIG. 5, the receive plate 39 and push plate 40 are made to approach each other. As a result of this, the outer race 13 and inner race 14, which are initially separated apart from each other as shown in FIG. 6A, approach each other in such a manner as shown in FIG. 6B. Then, the unit 38 and outer race side unit 35 are finally assembled in such a state as shown in FIG. 6C in which the rolling surfaces of the respective rolling members 3, 3 are in contact with the outer raceway 4 and inner raceway 6. In the assembled state shown in FIG. 6C, the thin portions formed in the end portion of the outer cylindrical portion 19 of the case 17 is bent inwardly in the diameter direction of the case 17, the bent portion 27 is formed as shown in FIG. 2. The outside diameter of the second sub-lip 134 is slightly smaller than the inside diameter of the outer race 13 when the inner seal ring 128 is in free condition. Therefore, if the assembling operation is carried out while the units are guided by the guide projection 41, then the second sub-lip 134 will not be rolled up in the inner peripheral edge portion of the outer race 13. When the bent portion 27 is previously formed, the assembling operation can be executed while the first outer seal lip 125 is elastically deformed to some excessive degrees.

According to the sealed thrust bearing of the present invention, since it is structured and operated in the above-mentioned manner, foreign matter will not enter between the end edges of the seal lips and their mating surfaces with which the end edges are respectively to be contacted. Therefore, wear of the seal lips end edge and their respective mating surfaces due to the foreign matter is prevented. Also, because the case with which the above end edges are to be contacted is formed of a corrosion resistant material, there is no possibility that the mating surfaces can gather rust, so that the end edges will not wear due to such rust.

What is claimed is:

1. A sealed thrust bearing, comprising:
   an annular-shaped outer race including an outer raceway on a surface thereof;
   an annular-shaped inner race including an inner raceway on a surface thereof and a cylindrical inner flange formed in an inner peripheral edge of the inner race and projecting from a side of the inner raceway;
   a plurality of rolling elements interposed rollably between the outer and inner raceways, and bearing a load between the outer race and the inner race in a thrust direction of the sealed thrust bearing;
   an annular-shaped outer seal ring fixedly fitted to an outer peripheral edge of the inner race;
   an annular-shaped inner seal ring fixedly fitted to an end edge portion of the inner flange of the inner race; and
   a case formed in an annular shape and fixedly fitted to the outer race, the case including:
   an annular-shaped flat portion;
   an outer cylindrical portion formed in an outer peripheral edge of the flat portion; and
   an inner cylindrical portion formed in an inner peripheral edge of the flat portion and having an outside diameter that is smaller than an inside diameter of the outer race;
   wherein the outer cylindrical portion and the inner cylindrical portion are bent in the same direction, and fitted over the outer race so as to cover the outer seal ring and the inner seal ring, respectively, wherein the outer seal ring comprises an elastic member including a first outer seal lip in sliding contact with an inner peripheral surface of the outer cylindrical portion of the case and a second outer seal lip in sliding contacting with a surface of the outer race that is close to an outer periphery of the outer race, each of the first and the second outer seal lips extending radially in a diametrical cross sectional direction of the sealed thrust bearing from the outer peripheral edge of the inner race inside the outer cylindrical portion, wherein the inner seal ring comprises an elastic member including a first inner seal lip in sliding contacting with an inner peripheral surface of the flat portion of the case and a second inner seal lip in sliding contact with an inner peripheral edge of the outer race, each of the first and the second inner seal lips extending radially in the diametrical cross sectional direction from the end edge portion of the inner flange inside the inner cylindrical portion.

2. The sealed thrust bearing of claim 1, wherein the case is formed of a material selected from a stainless steel sheet and synthetic resin.

3. The sealed thrust bearing of claim 2, wherein the outer cylindrical portion of the case comprises a bent portion formed by inwardly bending an end portion of the outer cylindrical portion in a diameter direction of the case.

4. A sealed thrust bearing, comprising:
   an annular-shaped outer race including an outer raceway on a surface thereof;
   an annular-shaped inner race including an inner raceway on a surface thereof;

a plurality of rolling elements interposed rollably between the outer and inner raceways, and bearing a load between the outer race and the inner race in a thrust direction of the sealed thrust bearing;

an annular-shaped outer seal ring fixedly fitted to an outer peripheral edge of the inner race, the outer seal ring comprising a core metal including:

a cylindrical portion fixedly fitted to the outer peripheral edge of the inner race;

an inwardly bent portion contacting with the surface of the inner race; and a projecting portion formed in a middle portion between the cylindrical portion and the inwardly bent portion and projecting outwardly from a corner portion of the inwardly bent portion; and a case formed in an annular shape and fixedly fitted to the outer race, the case including an annular-shaped flat portion and an outer cylindrical portion formed in an outer peripheral edge of the flat portion, wherein the outer seal ring comprises an elastic member including a first outer seal lip in slideable contact with an inner peripheral surface of the outer cylindrical portion of the case, a second outer seal lip in slideable contact with the surface of the outer race close to an outer periphery thereof, and a third outer seal lip in slideable contact with the surface of the outer race inward from the second outer seal lip, each of the first, the second and the third outer seal lips extending radially in a diametrical cross sectional direction of the sealed thrust bearing from the projecting portion inside the outer cylindrical portion.

5. The sealed thrust bearing of claim 4, wherein the outer seal ring includes a connecting portion reinforced by the projecting portion of the core metal, each of the first and second outer seal lips branching from the connecting portion, and the third outer seal lip is formed in the inwardly bent portion of the core metal locating near an inner periphery of the inwardly bent portion.

6. A sealed thrust bearing, comprising:

an annular-shaped outer race including an outer raceway on a surface thereof;

an annular-shaped inner race including an inner raceway on a surface thereof and a cylindrical inner flange formed in an inner peripheral edge of the inner race and projecting from a side of the inner raceway;

a plurality of rolling elements interposed rollably between the outer and inner raceways, and bearing a load between the outer race and the inner race in a thrust direction of the sealed thrust bearing;

a case formed in an annular shape and fixedly fitted to the outer race, the case including an annular-shaped flat portion; and an annular-shaped inner seal ring fixedly fitted to an end edge portion of the inner flange of the inner race, the inner seal ring comprising:

a core metal including a cylindrical portion fixedly fitted to the inner flange of the inner race and an inwardly bent portion contacting with an upper end edge of the inner flange; and an elastic member supported on the core metal, said elastic member including a first inner seal lip contacting slidingly with an inner peripheral surface of the flat portion of the case and a second inner seal lip having a first sub-lip and a second sub-lip, the first and second sub-lips contacting slidingly with an inner peripheral edge of the outer race, wherein each of the first and the second inner seal lips extends radially in a diametral cross section of the sealed thrust bearing from the end edge portion of the inner flange on the core metal.

7. The sealed thrust bearing of claim 6, wherein the second inner seal lip forms a first intersecting angle between the first and second sub-lips in contacting condition with the inner peripheral edge of the outer race, the first intersecting angle being larger than a second intersecting angle formed between the first and second sub-lips in a free condition.

8. The sealed thrust bearing of claim 6, further comprising an annular-shaped outer seal ring fixedly fitted to an outer peripheral edge of the inner race, wherein the case includes an outer cylindrical portion formed in an outer peripheral edge of the flat portion, the outer seal ring comprising:

a core metal including:

a cylindrical portion fixedly fitted to the outer peripheral edge of the inner race;

an inwardly bent portion contacting with the surface of the inner race; and a projecting portion formed in a middle portion between the cylindrical portion and the inwardly bent portion, and projecting outwardly from a corner portion of the inwardly bent portion; and an elastic member including:

a first outer seal lip contacting slidingly with an inner peripheral surface of the outer cylindrical portion of the case;

a second outer seal lip contacting slidingly with the surface of the outer race near an outer periphery thereof; and a third outer seal lip contacting slidingly with the surface of the outer race positioned inwardly from the second outer seal lip.

9. The sealed thrust bearing of claim 8, wherein the outer seal ring includes a connecting portion reinforced by the projecting portion of the core metal, each of the first and second outer seal lips branching from the connecting portion, and the third outer seal lip is formed in the inwardly bent portion of the core metal locating near an inner periphery of the inwardly bent portion.

10. The sealed thrust bearing of claim 8, wherein the case includes an inner cylindrical portion formed in an inner peripheral edge of the flat portion and having an outside diameter which is smaller than an inside diameter of the outer race, the outer and inner cylindrical portions being mutually bent formed in the same direction, the outer cylindrical portion being fitted over the outer race so as to cover the first and second outer seal lips of the outer seal ring, and the first and second inner seal lips of the inner seal ring.

11. The sealed thrust bearing of claim 10, wherein the case is formed of a material selected from a stainless steel sheet and synthetic resin.

12. The sealed thrust bearing of claim 11, wherein the outer cylindrical portion of the case comprises a bent portion formed by inwardly bending an end portion of the outer cylindrical portion in a diameter direction of the case.

* * * * *